United States Patent
Nagai et al.

(10) Patent No.: US 7,047,476 B2
(45) Date of Patent: May 16, 2006

(54) CODE ERROR CORRECTOR

(75) Inventors: Hiroki Nagai, Gifu-ken (JP); Shin-ichiro Tomisawa, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 360 days.

(21) Appl. No.: 10/464,921

(22) Filed: Jun. 19, 2003

(65) Prior Publication Data

US 2004/0015769 A1    Jan. 22, 2004

(30) Foreign Application Priority Data

Jun. 19, 2002  (JP) ............................ 2002-178615

(51) Int. Cl.
*H03M 13/00* (2006.01)
*G11C 29/00* (2006.01)
*G06F 11/00* (2006.01)
*G11B 17/00* (2006.01)

(52) U.S. Cl. ...................... 714/758; 714/769; 714/804; 369/53.35

(58) Field of Classification Search .................. None
See application file for complete search history.

(56) References Cited

U.S. PATENT DOCUMENTS

| | | | | |
|---|---|---|---|---|
| 5,436,917 A | * | 7/1995 | Karasawa | 714/755 |
| 5,805,618 A | * | 9/1998 | Shimizu | 714/771 |
| 6,158,039 A | * | 12/2000 | Cho et al. | 714/769 |
| 6,742,157 B1 | * | 5/2004 | Shieh et al. | 714/758 |

FOREIGN PATENT DOCUMENTS

JP    2001-237715    8/2001

* cited by examiner

*Primary Examiner*—Christine T. Tu
(74) *Attorney, Agent, or Firm*—Fish & Richardson P.C.

(57) ABSTRACT

A code error corrector that enables high speed reproduction of DVD data with a high error correction capability. The data read from the DVD is stored in a DRAM. A PI correction circuit, which performs error correction with an inner parity, and a PO correction circuit, which performs error correction with an outer parity, alternately perform error correction for a predetermined number of times on the data stored in the DRAM. The detection circuit checks whether an error is included in the error corrected data whenever error correction is performed. If an error is not detected, the repeating of the error correction is stopped even if the error correction has not been performed for the predetermined number of times.

6 Claims, 11 Drawing Sheets

CODE ERROR CORRECTOR

CROSS-REFERENCE TO RELATED APPLICATIONS

This application is based upon and claims the benefit of priority from prior Japanese Patent Application No. 2002-178615, filed on Jun. 19, 2002, the entire contents of which are incorporated herein by reference.

BACKGROUND OF THE INVENTION

The present invention relates to a code error corrector, and more particularly, to a device for correcting code errors in data to which error correction codes are added when reproducing the data.

When recording data to a recording medium, an error detection code (EDC) and an error correcting code are usually added to the data so that the data may be reproduced with high reliability.

Figure 1:
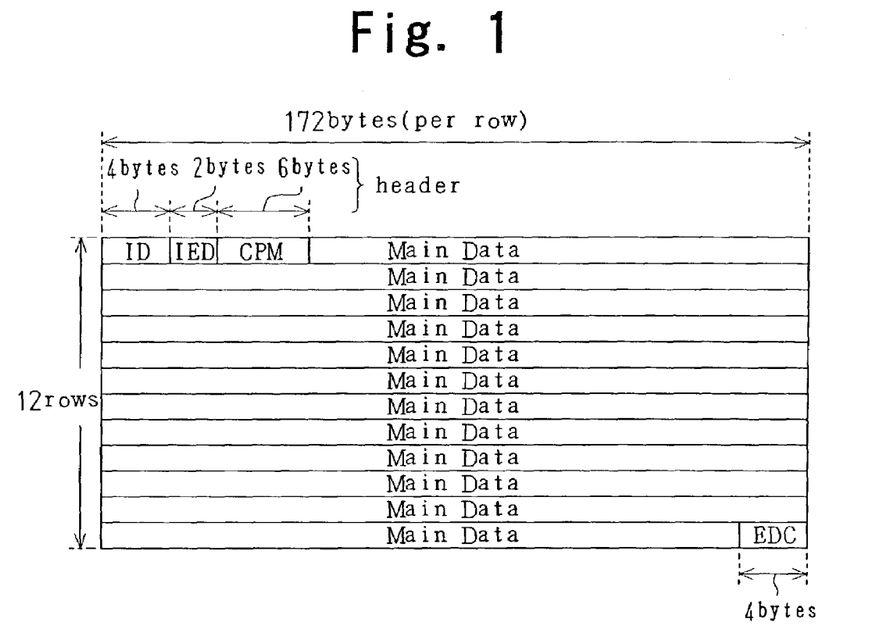
FIG. 1 shows the logical layout of a DVD data sector.

For example, in a DVD recorder that uses a digital versatile disk (DVD) as a recording medium, the data subject to recording is recorded in a plurality of DVD data sectors. Each DVD data sector has a logical layout, which is shown in FIG. 1.

The data subject to recording is first divided into units of 2,048 bytes. The data in each 2,048 byte data unit is referred to as main data. A header configured by 12 bytes of data is added to the head of each data unit, and an EDC configured by 4 bytes of data is added to the end of each data unit. The header is configured from 4 bytes of a sector number (ID), 2 bytes of an error detection parity (IED) for the ID, and 6 bytes of reserved data (CPM) such as copy protection information. The EDC serves as a detection parity for the section configured by the main data and the header. Accordingly, a single data sector is configured by 2,064 bytes of data, which includes the main data, the header, and the EDC. Further, the data sector includes twelve rows with each row having 172 bytes. To scramble the main data in the data sector, a pseudo-random noise (PN) sequence adding is performed.

Figure 2:
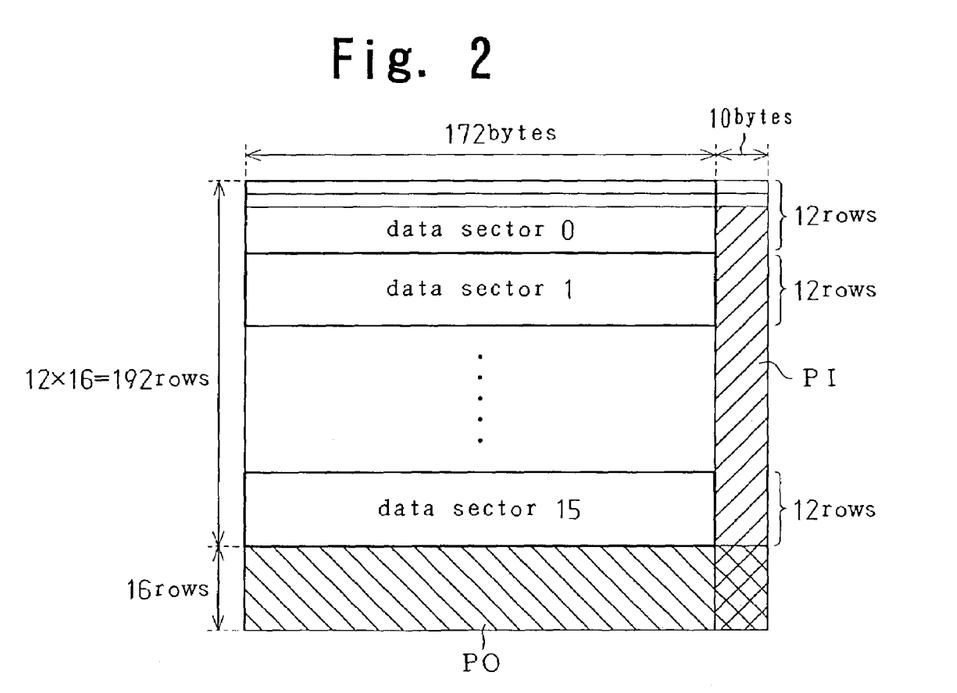
FIG. 2 shows the logical layout of an ECC block.

Referring to FIG. 2, 16 rows of an outer code parity (PO) and 10 columns of an inner code parity (PI) are added to 16 successive data sectors 0 to 15. The 16 successive data sectors 0 to 15 consist of 192 rows with each row consisting of 172 bytes. The ECC block has 208 rows with each row having 182 bytes (182 bytes×208 rows). The 208 rows of data, with each row consisting of 182 bytes, in which the PO and PI have been added is referred to as an error check and correction (ECC) block. The ECC block is the unit in which error correction and error detection are performed.

The PI added to each row is an error correction code that is based on the 172 bytes of data included in the row. Further, the PO added to each column is generated based on the 192 bytes of data included in the column.

Figure 3:
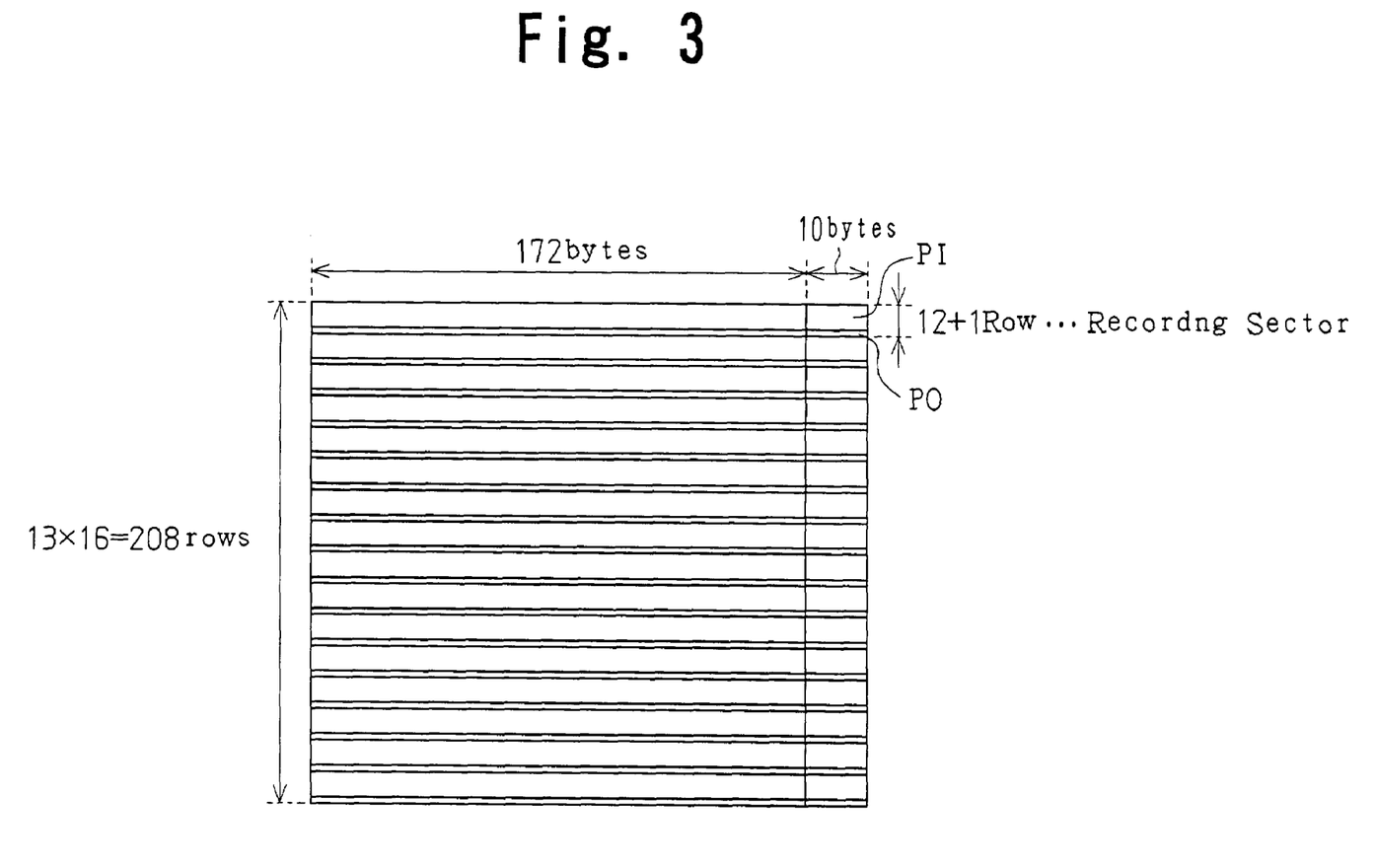
FIG. 3 shows the logical layout of the ECC block in which rows are scrambled.

Referring to FIG. 3, the 16 rows of the PO are each sequentially moved to a location following one of the 16 data sectors, to which the PI has been added. Thus, for each data sector, 10 bytes of the PI are added to each row and the PO is added in a 13th line. This generates a recording sector configured by 13 rows, with each row consisting of 182 bytes. In this manner, the ECC block, the rows of which are rearranged, configures 16 recording sectors. Hereafter, the ECC block of which rows are rearranged (FIG. 3) will hereinafter be simply referred to as a block.

The block undergoes 8–16 modulation, which is performed in DVDs, to generate recording data. The recording data is converted to serial data and then written to a DVD, which serves as the recording medium.

When reading the recording data from the DVD, dust or scratches on the surface of the DVD may affect the reading. In such a case, the read recording data may not be the same as the actually recorded data. In other words, a code error may be included in the read recording data. Thus, error correction and error detection are performed on the recording data with an error correction code, such as the PI and the PO, and the EDC.

The error correction and error detection are each performed by reading data from a memory and processing the data and then rewriting the processed result to the memory. Such series of processes are referred to as error check and correction (ECC), and the group of circuits performing ECC is referred to as an error check and correction unit.

Figure 4:
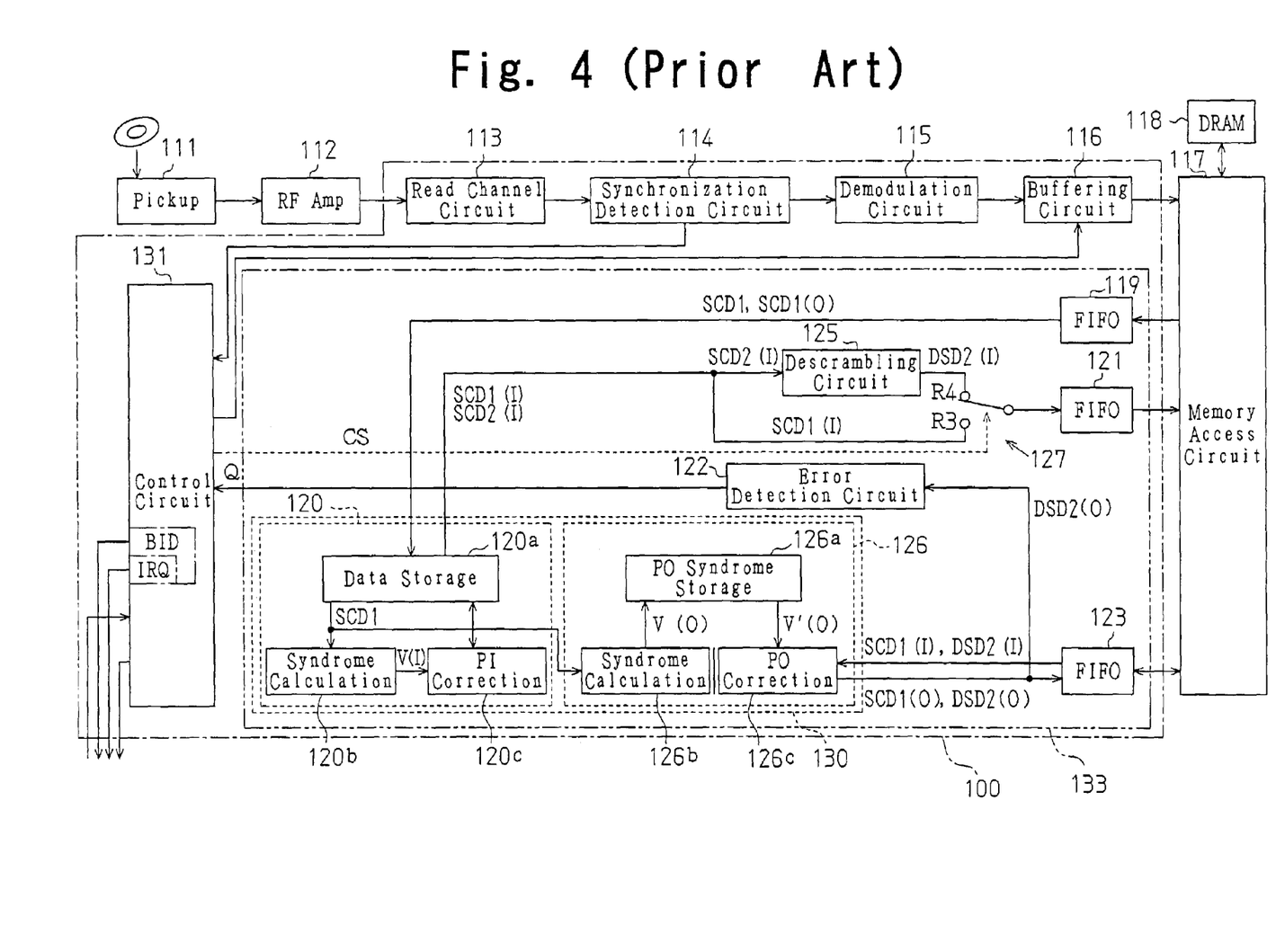
FIG. 4 is a block diagram of a prior art code error corrector.

FIG. 4 is a block diagram of a conventional code error corrector 100. The code error corrector 100 includes an ECC unit 133, which performs ECC.

Referring to FIG. 4, a pickup 111 detects a signal from a DVD. An RF amplifier 112 amplifies the signal and provides the amplified signal to the code error corrector 100. In accordance with the signal provided from the RF amplifier 112, a read channel circuit 113 generates a read channel clock signal, which has a predetermined frequency, and samples an input signal in accordance with the read channel clock signal to generate data. A synchronization detection circuit 114 detects a synchronization signal that corresponds to the block of the sampled signal and provides the synchronization signal to a control circuit 131. A demodulation circuit 115 demodulates the generated data to restore the original data that was subject to recording (the data prior to modulation) and provides the restored original data to the buffering circuit 116. The control circuit 131 provides the buffering circuit 116 with a write command in synchronism with the synchronization signal from the synchronization detection circuit 114. The buffering circuit 116 writes the data received from the demodulation circuit 115 to a dynamic random access memory (DRAM) 118, which is an external memory, via a memory access circuit 117.

In this manner, the recording data read from the DVD is sequentially stored in a ring buffer of the DRAM 118 in units of blocks. The ECC unit 133 performs error correction and error detection on the recording data stored in the DRAM 118 in synchronism with the synchronization signal.

The ECC unit 133 includes an error detection circuit 122, which performs error detection, and a correction circuit 130, which performs error correction. The correction circuit 130 includes a PI correction circuit 120, which performs error correction on a PI, and a PO correction circuit 126, which performs error correction on a PO.

Figure 5:
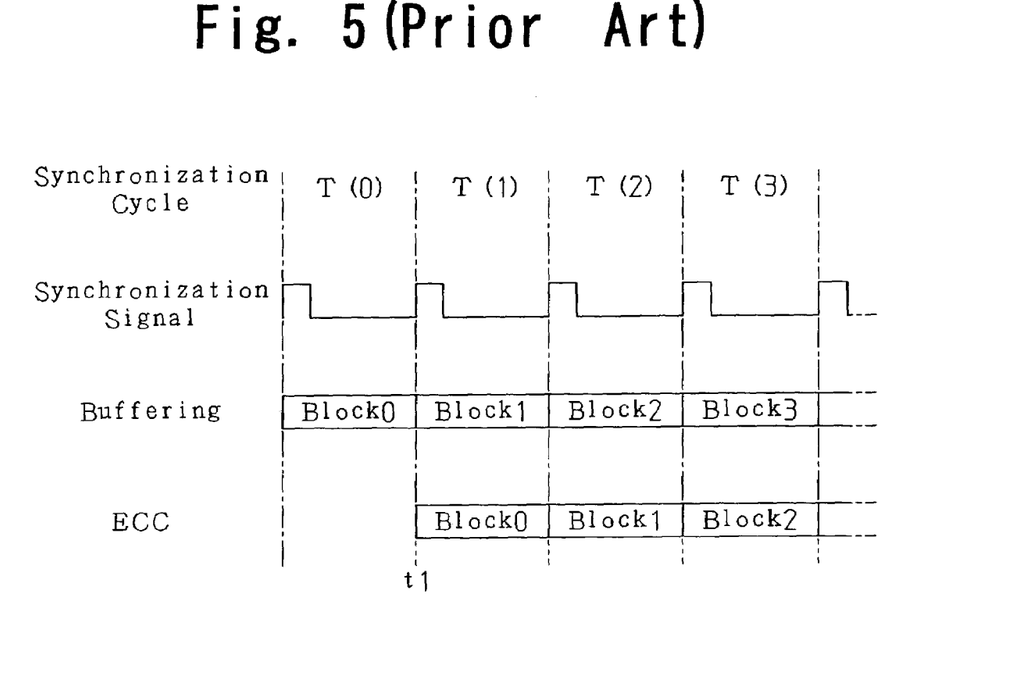
FIG. 5 is a timing chart illustrating buffering and ECC procedures in the prior art.

FIG. 5 is a timing chart illustrating the operation timing of the buffering and the ECC, which are performed in synchronism with the synchronization signal detected by the synchronization detection circuit 114. The cycle in which the synchronization signal goes high corresponds to one synchronization cycle.

In synchronization cycle T(0), the buffering circuit 116 first buffers block 0. The control circuit 131 of FIG. 4 sends an interrupt request IRQ to an external circuit (not shown) in synchronism with the synchronization signal of the control circuit 131. The external circuit reads an identification number BID, which identifies the block subject to buffering, from the control circuit 131.

In the next synchronization cycle T(1), the buffering circuit 116 buffers block 1 (refer to FIG. 6), which follows block 0, and the ECC unit 133 performs ECC on block 0.

When the next synchronization cycle T(2) starts, block 0, which has undergone the ECC, is read from the DRAM 118 in response to the interrupt request IRQ, which is issued by the control circuit 131.

In the same manner, the buffered block undergoes ECC in the next synchronization cycle. The block that has undergone the ECC is read from the DRAM 118 in response to the interrupt request IRQ of the next synchronization cycle. The identification number BID may be the ID of all of the 16 data sectors included in the corresponding block or the ID of the head data sector in the corresponding block.

Figure 6:
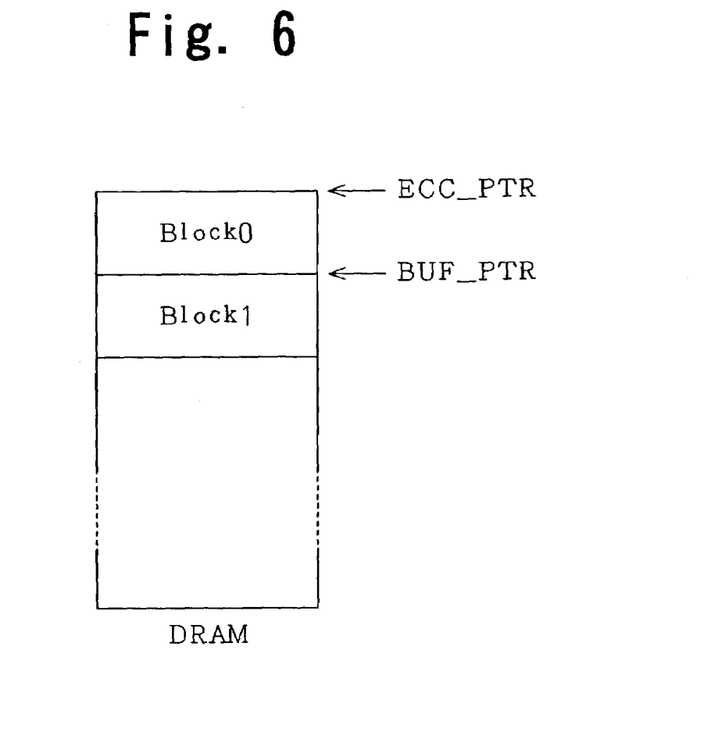
FIG. 6 is a diagram illustrating pointer information used during the buffering and ECC.

To perform ECC and buffering in parallel, the control circuit 131 manages pointer information, which indicates the block that is subject to ECC or buffering. FIG. 6 illustrates a block stored in the DRAM 118 that should undergo buffering and ECC. Pointer information BUF_PTR indicates block 1, and pointer information ECC_PTR indicates block 0. In other words, FIG. 6 illustrates the state of the ring buffer at time 1 of FIG. 5. As can be understood from the timing chart of FIG. 5, the pointer information ECC_PTR always indicates the block that is just one block ahead of the block indicated by pointer information BUF_PTR.

Figure 7:
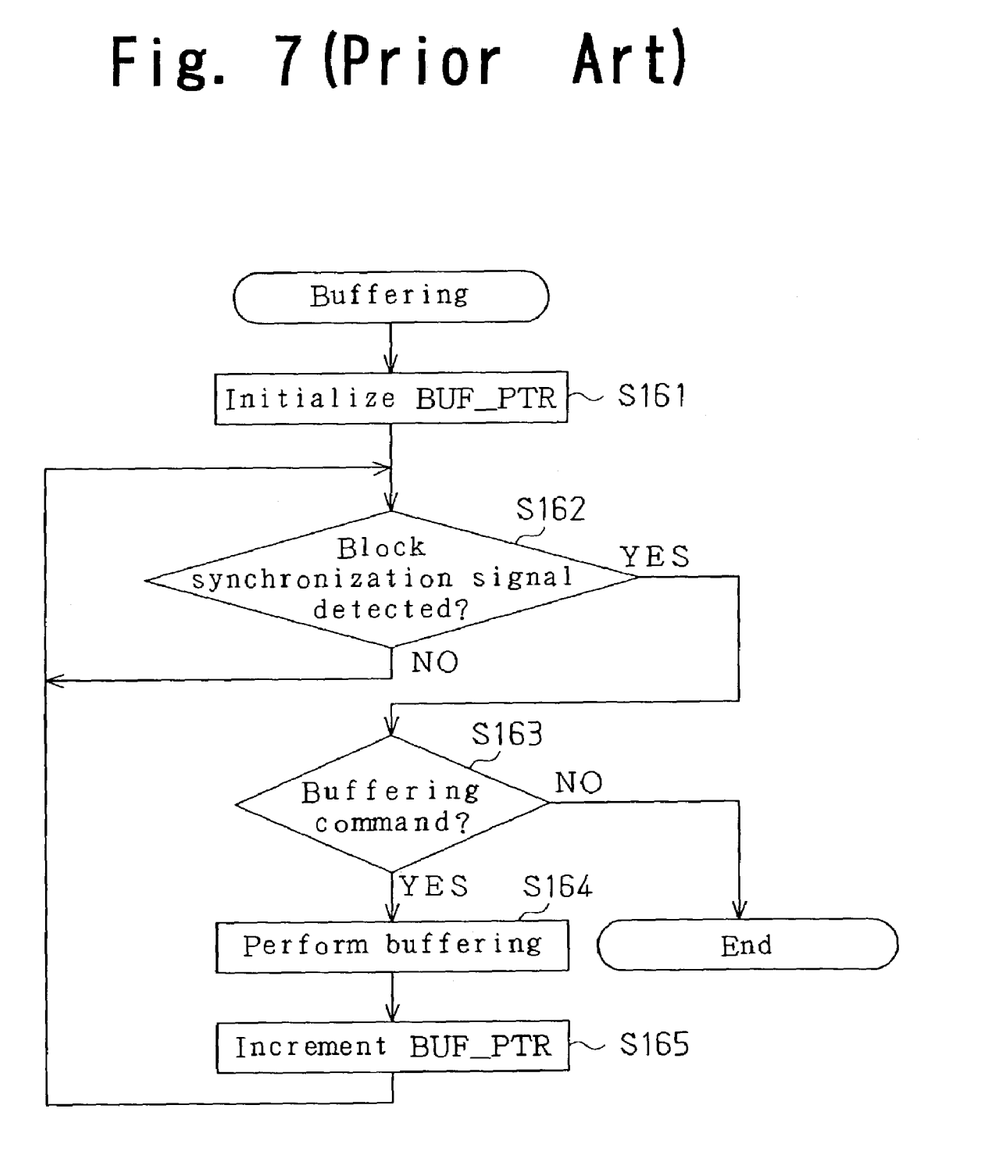
FIG. 7 is a flowchart illustrating the buffering procedures in the prior art.
Figure 8:
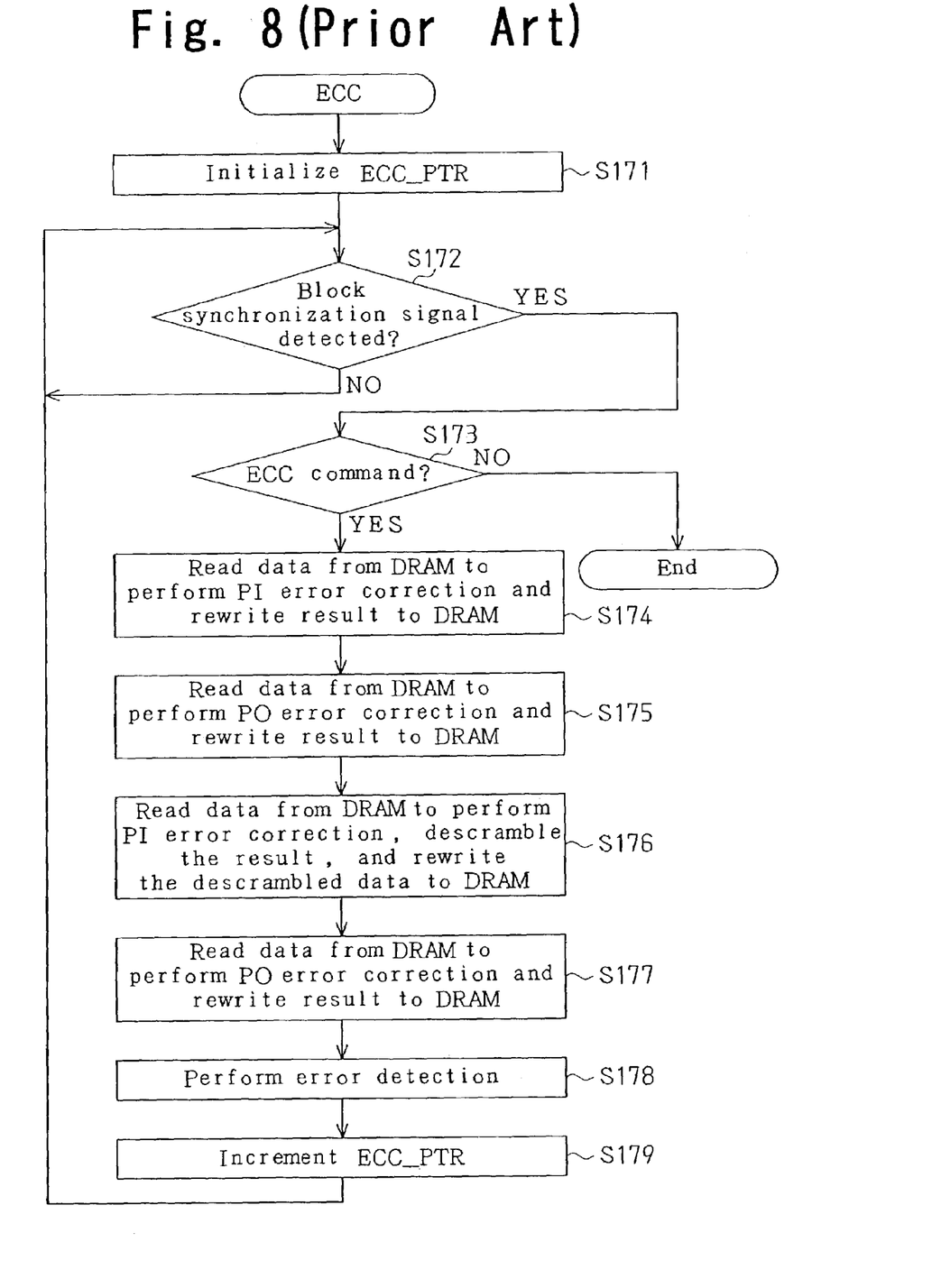
FIG. 8 is a flowchart illustrating the ECC procedures in the prior art.

FIG. 7 and FIG. 8 are flowcharts respectively illustrating the buffering and ECC in the prior art.

The buffering will first be discussed with reference to FIG. 7.

In response to a buffering initiation command from an external circuit, the control circuit 131 starts buffering. In step S161, the control circuit 131 initializes the pointer information BUF_PTR. In step S162, the control circuit 131 waits until detecting a block synchronization signal. When provided with the block synchronization signal from the synchronization detection circuit 114, in step S163, the control circuit 131 checks whether a buffering command is being issued. If the buffering command is not being issued, the control circuit 131 ends the buffering. If the buffering command is being issued, in step S164, the control circuit 131 instructs the buffering circuit 116 to buffer the block indicated by the pointer information BUF_PTR. After buffering the block, in step S165, the control circuit 131 increments the pointer information BUF_PTR by one block. Then, the control circuit 131 returns to a state in which it waits for the block synchronization signal (step S162).

The ECC will now be discussed with reference to FIG. 8.

In response to an ECC initiation command from an external circuit, in step S171, the control circuit 131 initializes the pointer information ECC_PTR. In step S172, the control circuit 131 waits until detecting the block synchronization signal. When receiving the block synchronization signal from the synchronization detection circuit 114, in step S173, the control circuit 131 checks whether an ECC command is being issued. If the ECC command is not being issued, the control circuit 131 ends the ECC. If the ECC command is being issued, the control circuit 131 activates the ECC unit 133.

The ECC unit 133 performs the steps subsequent to step S174. The data scrambled as described with FIGS. 1 to 3 is the subject of the error correction.

To increase the reliability of the reproduced data, the ECC unit 133 repetitively performs the series of processing on the PI and the PO a predetermined number of times, for example, two times. In such a case, the ECC unit 133 switches a switching circuit 127, which is connected to a FIFO 121, to select route R3, which bypasses a descrambling circuit 125. After switching the switching circuit 127, the ECC unit 133 starts performing ECC.

The PI correction circuit 120, which performs error correction of a PI, reads data SCD1, which is subject to the PI error correction (PI correction) for the first time, from the recording data stored in the DRAM 118 via an FIFO 119 and stores the data SCD1 in a data storage section 120a. In this state, the amount of the data SCD1 stored in the data storage section 120a is 182 bytes (172 bytes of main data and 10 bytes of the PI), which corresponds to one row of the recording sector illustrated in FIG. 3. Then, a syndrome calculation circuit 120b of the PI correction circuit 120 retrieves the data SCD1 from the data storage section 120a, and the data storage section 120a provides the data SCD1 to a syndrome calculation circuit 126b of the PO correction circuit 126, which performs error correction of a PO. In this state, instead of providing the syndrome calculation circuit 126b with the data SCD1, the data storage section 120a may provide the syndrome calculation circuit 126b with data SCD1(I) that has undergone PI correction (described later).

The syndrome calculation circuit 120b calculates a PI syndrome V(I) and provides the syndrome V(I) to a PI correction circuit 120c of the PI correction circuit 120. Based on the syndrome V(I), the PI correction circuit 120c correctly rewrites the erroneous part of the data stored in the data storage section 120a to perform PI correction. Then, the PI correction circuit 120c provides the PI corrected data SCD1(I) to the DRAM 118 via the FIFO 121.

At the same time, the syndrome calculation circuit 126b of the PO correction circuit 126 calculates a syndrome V(0) of each column of the PO for the row of data SCD1 from the data storage section 120a and provides the syndromes V(0) to a PO syndrome storage section 126a. In this state, the syndromes V(0) for 182 columns are stored in the PO syndrome storage section 126a.

Such processing is repetitively performed 16 times for the 13-row recording sectors to complete the PI correction of one block of data. In this state, the PO syndrome storage section 126a stores the PO syndromes V'(0) for 182 columns×16. A PO correction circuit 126c retrieves the syndromes V'(0) from the PO syndrome storage section 126a, retrieves the PI corrected data from the DRAM 118 via an FIFO 123, and completes the PO error correction of the recording sector (steps S174 and S175). As a result, the error corrected data SCD1(0) for the first PI and PO are stored via the FIFO 123 in the DRAM 118.

When the first PI and PO corrections are completed, the PI and PO corrections are performed for a second time. The route configured by the switching circuit 127 is switched to route R4, which is used to perform descrambling. After the switching to route R4, the data SCD1(0) of the first PI and PO corrections are stored in the data storage section 120a of the PI correction circuit 120 via the FIFO 119. Then, the PI correction circuit 120 performs PI correction on the data stored in the data storage section 120a and calculates the PO syndrome V(0). Then, the PI correction circuit 120 provides the descrambling circuit 125 with data SCD2(I) that was PI corrected for the second time. The descrambling circuit 125 descrambles the data SCD2(I) and stores the descrambled data DSD2(I) in the DRAM 118 via the FIFO 121. Further, the syndrome calculation circuit 126b calculates the PO syndrome V(0) and stores the calculated PO syndrome V(0) in the PO syndrome storage section 126a.

Such processing is repeated for one block to perform PI correction for the second time and store the final syndromes V'(0) for the one block in the PO syndrome storage section 126a. The PO correction circuit 126c retrieves the data DSD2(I) that has been PI corrected and descrambled for the second time from the DRAM 118 via an FIFO 123 and performs PO correction. Data DSD2 (0) that has undergone PO correction for the second time is stored in the DRAM 118 via the FIFO 123 (steps S176 and S177). The ECC is described in, for example, Japanese Laid-Open Patent Publication No. 2001-237715. Then, the error detection circuit 122 performs error detection on the data DSD2(0) that has undergone error correction two times for the PI and two times for the PO (step S178). In the error detection, the error detection circuit 122 compares the accumulatively added value of the main data for each recording sector and the EDC included in the recording sector. The error detection circuit 122 determines whether the accumulatively added value matches the EDC in every recording sector of the block and writes the results to the control circuit 131.

Finally, in step S179, the control circuit 131 increments pointer information ECC_PTR, completes the ECC of the data of the block, and returns to a state in which it waits for the next block synchronization signal.

In this manner, the data of the block that has completed ECC is ultimately stored in the DRAM 118 in a descrambled state. In step S174, data is re-written to the DRAM 118 without being descrambled so that scrambled data is read when performing error correction again later on.

Figure 9:
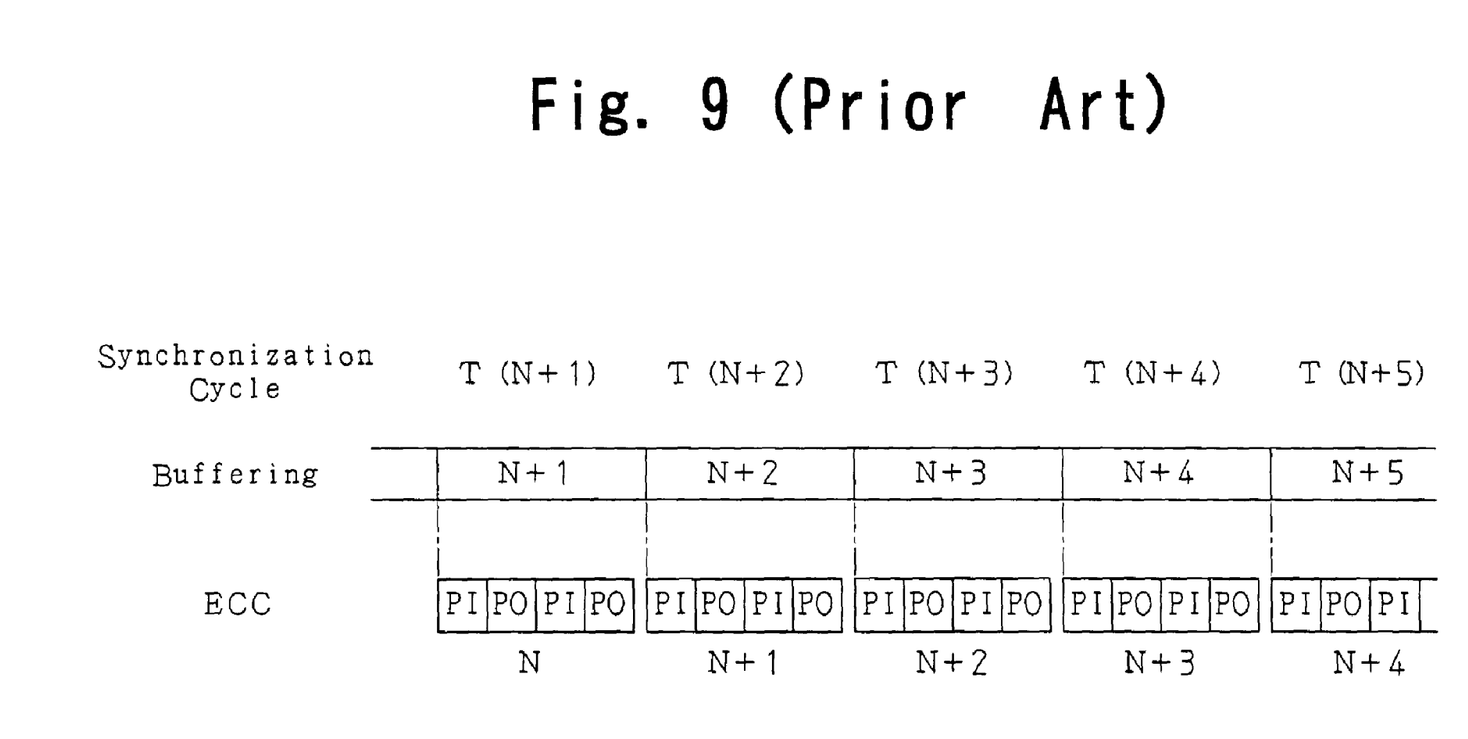
FIG. 9 is a timing chart illustrating the buffering and ECC procedures performed by the code error corrector of FIG. 4.

FIG. 9 is a timing chart illustrating the conventional buffering and the ECC. In synchronization cycle T (N+1), the buffering circuit buffers block (N+1). Further, the ECC unit 133 performs error correction two times on the PI and on the PO for block N.

In the following synchronization cycle T(N+2), the buffering circuit 116 buffers block (N+2). Further, the ECC unit 133 performs error correction two times on the PI and on the PO for block (N+1).

In this manner, the data of the block buffered by the buffering circuit 116 always undergoes error correction of the PI for two times and the PO for two times in the next synchronization cycle before being stored in the DRAM 118.

In a prior art DVD reproduction device, the DRAM 118 is accessed not only by the code error corrector 100 but also by other circuits, such as microcomputers (not shown). Accordingly, as the frequency of accesses to the DRAM 118 increases, the access waiting time becomes longer. The long access waiting time makes it difficult to increase the speed for reproducing the data recorded to the DVD.

SUMMARY OF THE INVENTION

One aspect of the present invention is a code error corrector for correcting a code error in input data generated by adding an error detection code to main data, scrambling the main data, and adding an error correction code to the scrambled data and the error detection code. The code error corrector is used with a buffer memory and includes a correction circuit for performing error correction on the input data based on the error correction code to generate first data. A descrambling circuit is connected to the correction circuit to descramble the first data and generate second data. The descrambling circuit writes the second data to the buffer memory. A detection circuit is connected to the descrambling circuit to perform error detection on the second data based on the error detection code. A scrambling circuit reads the second data from the buffer memory and scrambles the second data to generate third data. A switching circuit is connected between the scrambling circuit and the correction circuit to provide either one of the third data and the input data to the correction circuit. The correction circuit repetitively performs the error correction on the input data, and the detection circuit performs the error detection after each time the error correction circuit performs the error correction. The repeating of the error correction is stopped if the detection circuit does not detect a data error.

A further aspect of the present invention is a method for correcting a code error in a data block including scrambled data, an error detection code, a first error correction code, and a second error correction code. The method including generating first correction data by performing error correction on the data block based on the first error correction code, generating descrambled data by descrambling the first correction data, storing the descrambled data, detecting whether an error is included in the descrambled data, retrieving the descrambled data, generating second correction data by performing error correction on the retrieved descrambled data based on the second error correction code, storing the second correction data, detecting whether an error is included in the second correction data, retrieving the second correction data, generating scrambled data by scrambling the retrieved second correction data, repeating the above series of steps for a predetermined number of times using the scrambled data in lieu of the block data, and stopping said repeating before reaching the predetermined number of times if an error is not detected in said detecting of error in the descrambled data and detecting of error in the second correction data.

Another aspect of the present invention is a code error corrector for correcting a code error in a data block including an error detection code, a first error correction code, a second error correction code, and scrambled data. The code error corrector includes a first correction circuit for performing error correction on the data block based on the first error correction code to generate first correction data. A first error detection circuit detects whether an error is included in the first correction data. A second correction circuit performs error correction on the first correction data based on the second error correction code to generate second correction data. A second error detection circuit detects whether an error is included in the second correction data. A controller for alternately providing the first correction circuit and the second correction circuit with a signal for activating the respective first correction circuit and second correction circuit when either one of the first and second error detection circuits are continuously operating for detecting a data error and until the first error correction circuit, the second error correction circuit, the first error detection circuit, and the second error detection circuit perform processing for a predetermined number of times.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A code error corrector 10 according to a preferred embodiment of the present invention will now be discussed with reference to FIGS. 10 to 12. The code error corrector 10 is incorporated in a DVD recorder for reproducing data recorded on a DVD with an error correction code. The code error corrector 10 reads data from the DVD and repetitively performs error correction using the error correction code to correct code error in the data. The data recorded on the DVD includes an error detection code (EDC), which is added to each recording sector, and an error correction code, to which an inner code parity (PI) and an outer code parity (PO) are added.

Figure 10:
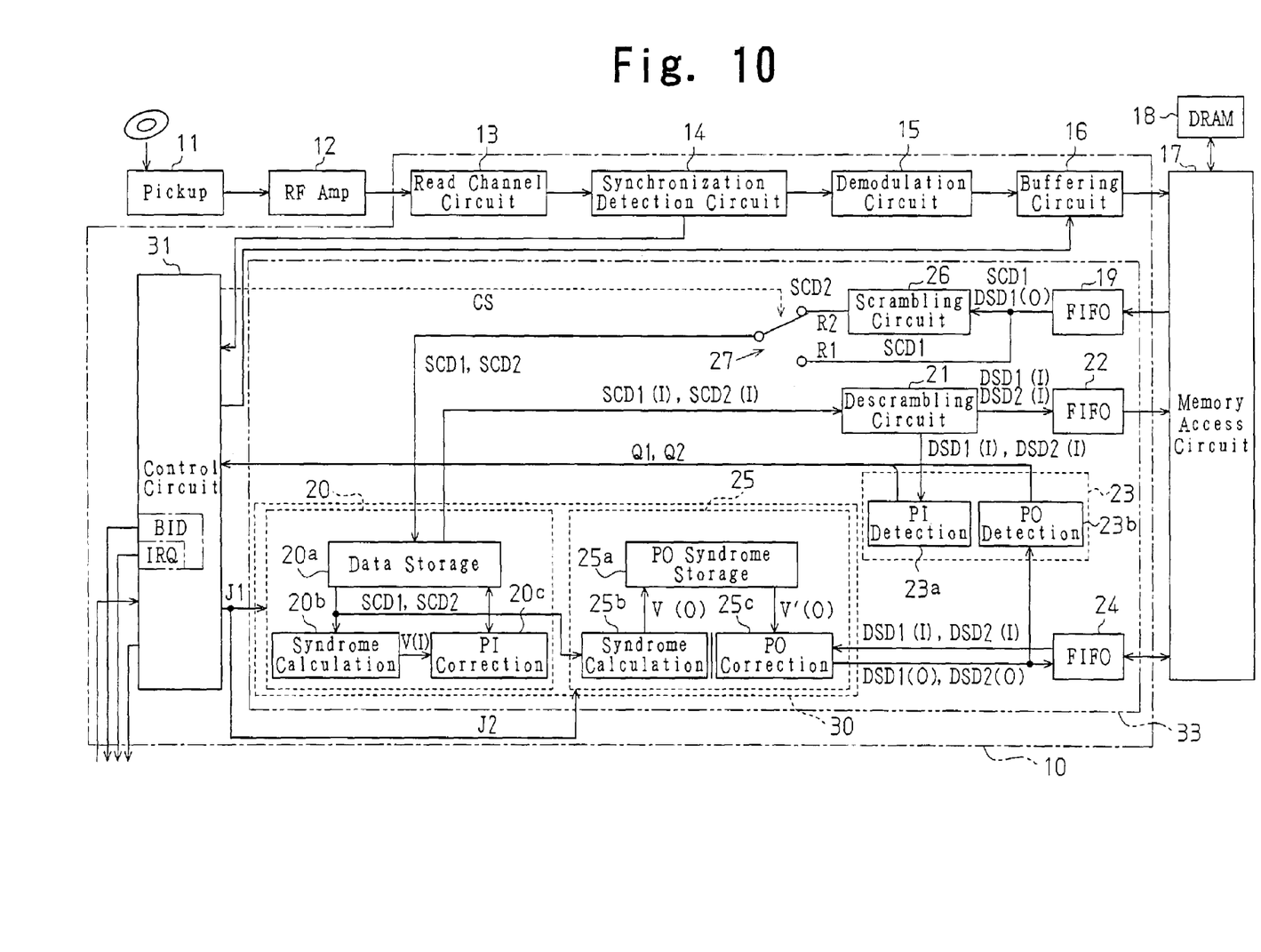
FIG. 10 is a block diagram of a code error corrector according to a preferred embodiment of the present invention.

FIG. 10 is a block diagram showing the code error corrector 10 and its peripheral circuits. The code error corrector 10 includes a control circuit 31 and an ECC unit 33. The ECC unit 33 is connected to an external memory, or a dynamic random access memory (DRAM) 18 via a memory access memory circuit 17. The ECC unit 33 transfers data with a DRAM 18 and performs error check and correction (ECC), which includes error correction and error detection of data.

A pickup 11 detects a signal from a DVD. An RF amplifier 12 amplifies the signal and provides the amplified signal to a read channel circuit 13 of a code error corrector 10. In accordance with the signal provided from the RF amplifier 12, the read channel circuit 13 generates a read channel clock signal, which has a predetermined frequency, and samples an input signal in accordance with the read channel clock signal to generate data. A synchronization detection circuit 14 detects a synchronization signal that corresponds to the block of the sampled signal and provides the synchronization signal to a control circuit 31. A demodulation circuit 15 demodulates the generated data to restore the original data that was subject to recording (the data prior to modulation) and provides the restored original data to a buffering circuit 16. The control circuit 31 provides the buffering circuit 16 with a write command in synchronism with the synchronization signal from the synchronization detection circuit 14. In response to the write command, the buffering circuit 16 writes the data received from the demodulation circuit 15 to the dynamic random access memory (DRAM) 18, which is an external memory, via the memory access circuit 17. In this manner, the data recorded on the DVD is stored in the DRAM 18.

The recording data read from the DVD is sequentially stored in a ring buffer of the DRAM 18 in units of blocks.

The ECC unit 33 performs error correction and error detection on the data stored in the DRAM 18 in synchronism with the synchronization signal.

The ECC unit 33 includes an error detection circuit 23, which performs error detection, and a correction circuit 30, which performs error correction. The correction circuit 30 includes a PI correction circuit 20, which performs error correction on a PI, and a PO correction circuit 25, which performs error correction on a PO.

The ECC unit 33 differs from the prior art ECC unit 133 of FIG. 4 as described below.

The ECC unit 33 includes a scrambling circuit 26 for scrambling the data read from the DRAM 18 by the PI correction circuit 20.

Further, the ECC unit 33 includes a switching circuit 27 for switching the data that is to be provided to the PI correction circuit 20 to either one of the data scrambled by the scrambling circuit 26 or the data that has not been scrambled.

The detection circuit 23 of the ECC unit 33 includes a PI detection circuit 23a and a PO detection circuit 23b respectively corresponding to the PI correction circuit 20 and the PO correction circuit 25.

The code error corrector 10 also performs buffering and ECC in synchronism with the synchronization signal detected by the synchronization detection circuit 114 at the timings shown in FIG. 5. The cycle in which the synchronization signal goes high corresponds to one synchronization cycle. The buffering circuit 16 completes buffering in a single cycle. When doing so, the control circuit sends an interrupt request IRQ to an external circuit (not shown). The external circuit reads an identification number BID, which identifies the block subject to buffering, from the control circuit 31.

In the next synchronization cycle, the buffering circuit 16 buffers the next block, and the ECC unit 133 performs ECC on the buffered block. When the next synchronization cycle starts, the block that has undergone the ECC is read from the DRAM 18 in response to the interrupt request IRQ issued by the control circuit 31.

In the same manner, the buffered block undergoes ECC in the next cycle. The block that has undergone the ECC is read from the DRAM 18 in response to the interrupt request IRQ of the next cycle. The identification number BID may be the ID of all of the 16 data sectors included in the corresponding block or the ID of the head data sector in the corresponding block.

To perform ECC and buffering in parallel, as shown in FIG. 6, the control circuit 31 manages pointer information, which indicates the block that is subject to ECC or buffering. The control circuit 31 includes pointer information BUF_PTR, which indicates the block that is undergoing buffering, and pointer information ECC_PTR, which indicates the block that is undergoing ECC. The pointer information ECC_PTR constantly indicates the block that is just in front of the block indicated by the pointer information BUF_PTR.

The ECC that is performed in the preferred embodiment will now be discussed with reference to the flowcharts of FIGS. 11A and 11B. The buffering performed to store the data read from the DVD in the DRAM 18 is performed in the same manner as described in FIG. 7 and will thus not be discussed.

In response to an ECC initiation command from an external circuit, in step S201, the control circuit 31 initializes the pointer information ECC_PTR. In step S202, the control circuit 31 waits until detecting a block synchronization signal. When receiving the block synchronization signal from the synchronization detection circuit 14, in step S203, the control circuit 31 checks whether an ECC command is being issued. If the ECC command is not being issued, the control circuit 31 ends the ECC. If the ECC command is being issued, the control circuit 31 activates the ECC unit 133 and proceeds to step S304.

To perform error correction appropriately, scrambled data must be the processing subject.

The control circuit 31 first provides the switching circuit 27 with a control signal CS and performs switching with the switching circuit 27 to select route R1 in which the correction circuit 30 is not connected to the scrambling circuit 26. The ECC starts when the switching with the switching circuit 27 is completed.

The PI correction circuit 20 reads the block indicated by the pointer information ECC_PTR, that is, data SCD1 (1 row of 182 bytes) from the data stored in the DRAM 18 via an FIFO 19 and stores the data SCD1 in a data storage section 20*a*. The stored data SCD1 is provided to a syndrome calculation circuit 20*b* of the PI correction circuit 20 and a syndrome calculation circuit 25*b* of the PO correction circuit 25. In this state, instead of providing the syndrome calculation circuit 25*b* with the stored data SCD1, the syndrome calculation circuit 25*b* may be provided with data SCDI(I) that has undergone PI correction (described later). The syndrome calculation circuit 20*b* calculates a syndrome V(I) of the data SCD1 based on the PI. Based on the calculated PI syndrome V(I), the PI correction circuit 20*c* performs error correction (PI correction) of the PI for the data SCD1. The syndrome calculation circuit 25*b* of the PO correction circuit 25 calculates a syndrome V(0) of the data SCD1 based on the PO and stores the calculated syndromes for the 182 columns in the PO storage section 25*a*.

Then, the PI correction circuit 20 provides the PI corrected data SCD1(I) to the descrambling circuit 21. The descrambling circuit 21 descrambles the data SCD1(I) to generate descrambled data DSD1(I). The descrambling circuit 21 writes the descrambled data DSD1(I) to the DRAM 18 via an FIFO 22 and also provides the descrambled data DSD1(I) to the PI detection circuit 23*a*. Such procedures are repetitively performed 16 times for the 13-row recording sectors to perform PI correction for the first time on one block of data (step S304).

In step S305, the PI detection circuit 23*a* performs error detection in the PI direction (row direction) and provides the detection result Q1 to the control circuit 31. The error detection is also performed for each recording sector by comparing whether the value of the accumulatively added main data matches the EDC included in the recording sector.

If a data error is not detected during the PI error detection (NO in step S305), the control circuit 31 determines that there is no data error in the block subject to ECC and generates a control signal J1 to provide the PI correction circuit 20 with a processing termination command. As a result, in step S305, the ECC is ended. In step S312, the control circuit 31 increments the pointer information ECC_PTR and returns to a state in which it waits for the next block synchronization signal (step S202 of FIG. 11A).

If a data error is detected during the PI error detection (YES in step S305), the control circuit 31 provides the PO correction circuit 25 with a control signal J2. In step S306, the PO correction circuit 25 performs error correction of the PO (PO correction) in response to the control signal J2.

In step S306, among the data stored in the DRAM 18, the PO correction circuit 25*c* reads the descrambled data DSD1(I) that has undergone the first PI correction via an FIFO 24. The PO correction circuit 25*c* performs PO correction on the data DSD1(I) in accordance with the syndrome V'(0) corresponding to the syndrome V(0) obtained in step S304. The descrambling is performed in a regular manner in accordance with a predetermined rule. Thus, as long as the syndrome V'(0), which indicates the error position and the error level, is calculated, PO correction of the descrambled data is enabled.

In step S307, the PO detection circuit 23*b* of the detection circuit 23 performs error detection on the data DSD1(0), which has undergone PO correction for the first time, in the PO direction (column direction) and provides the detection result Q2 to the control circuit 31. If a data error is not detected in step S307 (NO), the processing of step S312 is performed. Then, the ECC is completed. If a data error is detected in step S307 (YES), in step S308, the PI error correction is performed for the second time.

In step S308, the control circuit 31 provides the control signal CS to the switching circuit 27 and performs switching with the switching circuit 27 to select route R2, in which the correction circuit 30 is connected to the scrambling circuit 26. The scrambling circuit 26 retrieves data DSD1(0) of which PI and PO have undergone the error correction for the first time via the FIFO 19. The scrambling circuit 26 scrambles the data SCD1(0) to generate scrambled data SCD2 and provides the scrambled data SCD2 to the data storage section 20*a*.

In the same manner as in step S304, the PI correction circuit 20 performs error correction on the PI of the scrambled data SCD2 and provides the corrected data SCD2(I) to the descrambling circuit 21. The descrambling circuit 21 descrambles the data SCD2(I) to generate descrambled data DSD2(I) and rewrites the descrambled data DSD2(I) to the DRAM 18 via the FIFO 22.

In step S309, the detection circuit 23 performs error detection on the descrambled data DSD2(I) in the PI direction and provides the detection result Q1 to the control circuit 31. If a data error is not detected in the descrambled data DSD2(I) (NO in step S309), the processing of step S312 is performed. Then, the ECC is completed. If a data error is detected (YES in step S309), in step S310, the PO correction circuit 25 performs PO correction for the second time.

In step S310, the PO correction circuit 25*c* reads the PI corrected data DSD2(I) through the FIFO 24 and performs PO correction for the second time on the data DSD2(0). This generates data DSD2(0), which has undergone PO correction for the second time. The PO correction of step S310 is performed in accordance with the syndrome V'(0) corresponding to the syndrome V(0) calculated in step S308.

In step S311, the PO detection circuit 23*b* performs error detection on the data DSD2(0), which has undergone the PO correction for the second time, in the PO direction (column direction) and provides the detection result Q2 to the control circuit 31. In step S311, the error detection result is held and a determination based on the error detection result is not performed. The ECC of the block is completed in this manner.

Figure 11A:
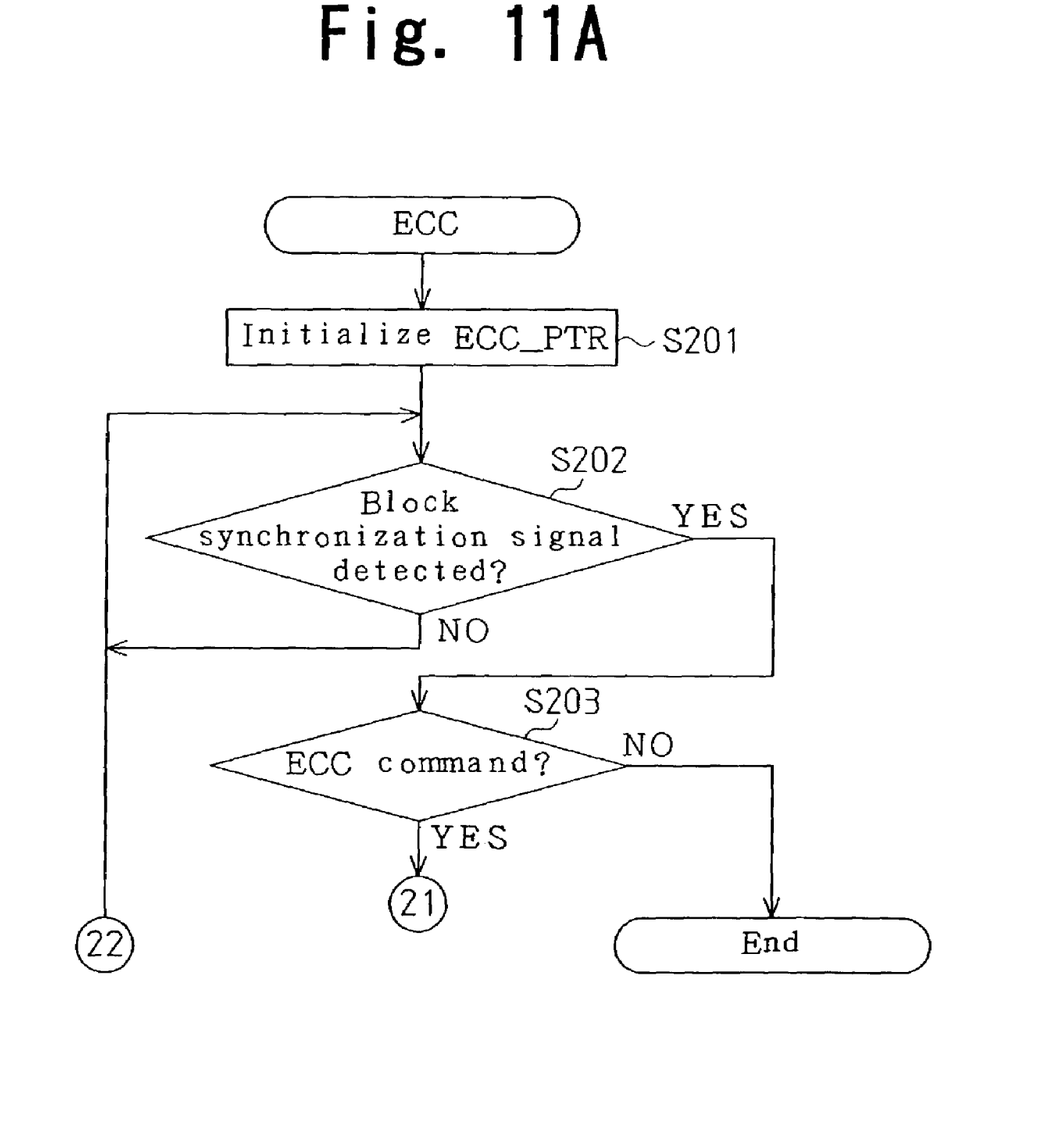
FIGS. 11A and 11B are flowcharts illustrating the ECC procedures performed by the code error corrector of FIG. 10.
Figure 11B:
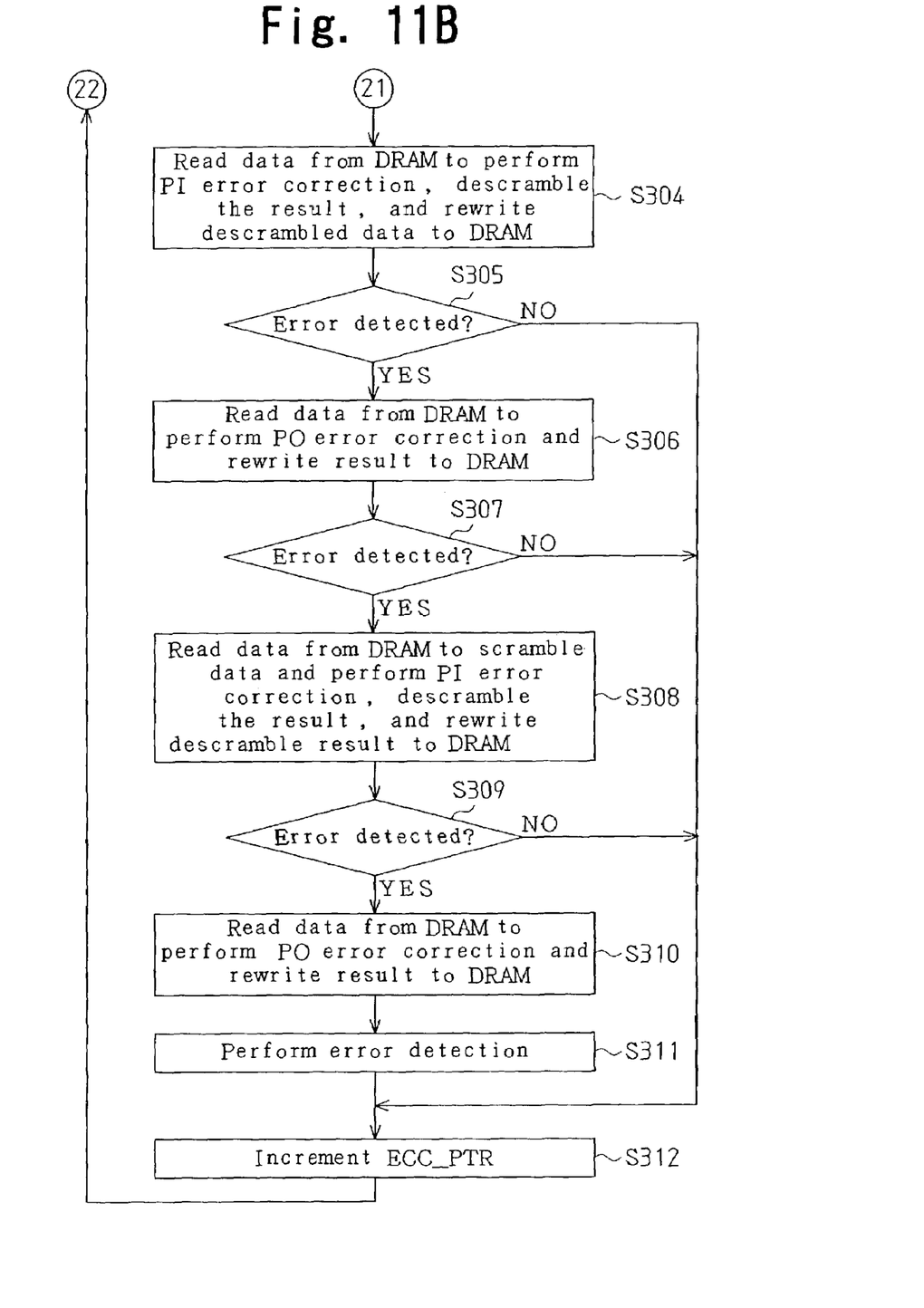

In step S312, the control circuit 31 increments the pointer information ECC_PTR and returns to a state in which it waits for the next block synchronization signal (step S202 of FIG. 11A).

In steps S202 to S312, the error correction is performed alternately with the PI and with the PO until no errors are detected in the data. However, the error correction is repeated for a limit of two times with the PI and a limit of two times with the PO. When the ECC of a single block ends, descrambled data is always rewritten to the DRAM 18 regardless of which step the ECC ends in. In other words, the data rewritten to the DRAM 18 may be used as the original main data regardless of how many times the error correction is repeated.

In the preferred embodiment, the repeated number of times the error correction with the PI and the PO are performed is limited to two times each. Two times is the number of times the error correction may be performed in a single synchronization cycle. Accordingly, the repeated number of times may be changed in accordance with the specification of the code error corrector 10.

ECC is repeated for a single block until the condition of the ECC command signal not being detected is satisfied. The ECC command signal is not detected, for example, when completing the reading of the desired data from a DVD or when the reproduction of data is interrupted for one reason or another.

Figure 12:
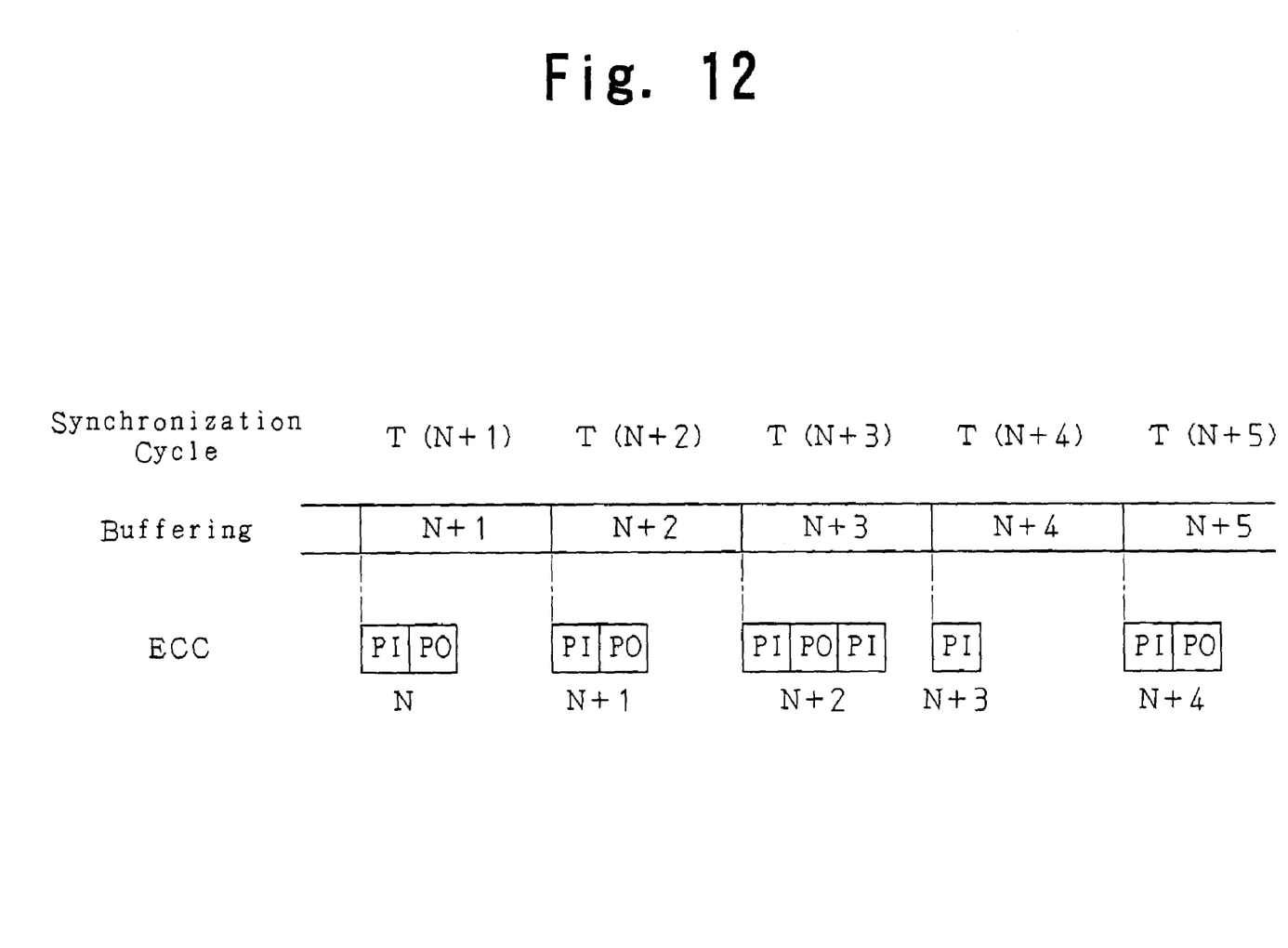
FIG. 12 is a timing chart illustrating the buffering and ECC procedures performed by the code error corrector of FIG. 10.

FIG. 12 is a timing chart of the buffering and ECC in the preferred embodiment.

In synchronization cycle T(N+1), the buffering circuit 16 buffers block (N+1). In synchronization cycle T(N+1), the ECC unit 33 performs error correction with the PI once and with the PO once on block N in the order of PI and then PO.

In the following synchronization circuit T(N+2), the buffering circuit 16 buffers block (N+2). In synchronization cycle T(N+2), the ECC unit 33 performs error correction with the PI once and with the PO once on block (N+1) in the order of PI and then PO.

In synchronization cycle T(N+3), the buffering circuit 16 buffers block (N+3), and the ECC unit 33 performs error correction on block (N+2) in the order of PI, PO, and PI for a total of three times.

In synchronization cycle T(N+4), the buffering circuit 16 buffers block (N+4), and the ECC unit 33 performs error correction with the PI on block (N+3) once.

Subsequently, in the same manner, the data buffered by the buffering circuit 16 always undergoes error correction alternately with the PI and the PO for a limit of two times in the next synchronization cycle until it is determined that there are no errors. The result is stored in the DRAM 118.

The code error corrector 10 of the preferred embodiment has the advantages described below.

(1) When determining that an error is not detected, the detection circuit 23 ends the ECC of the block that is subject to processing (steps S305, S307, and S309). Thus, in comparison with the prior art in which the number of times for the error correction is predetermined, the preferred embodiment reduces the number of times the error correction is performed. Accordingly, the frequency the code error accesses the DRAM 18 decreases without decreasing the data reproduction reliability. This saves the bandwidth of the DRAM 18, decreases the waiting time for accessing the DRAM 18, and enables high speed reproduction of data.

(2) The error corrected and descrambled data is always rewritten to the DRAM 18. Thus, regardless of when the error correction performed on the data scrambled and recorded on the DRAM 18 is interrupted, the data rewritten to the DRAM 18 is always used as main data.

(3) The code error corrector 10 includes the synchronization detection circuit 14, which detects a synchronization signal from the signal read from the DVD, and the buffering circuit 16, which buffers to the DRAM 18 the data of the ECC block retrieved and demodulated in synchronism with the detected synchronization signal. Thus, the control circuit 31 instructs the buffering circuit 16 to buffer data in synchronism with the synchronization signal, which is accurately generated based on the signal read from the DVD.

(4) The ECC of each block is performed for the maximum number of times that is possible in a single synchronization cycle. Thus, even if an error may not be corrected when repeating the error correction for a predetermined number of times, the ECC of the next block is smoothly performed without being affecting by the ECC performed on the preceding block. Further, an external circuit may refer to the error detection result to determine whether or not an error exists in the data read from the DVD.

(5) The code error corrector 10 alternately performs error correction with the PI and error correction with the PO on the data read from a DVD to which the inner parity PI and the outer parity PO are added. Thus, the code error corrector 10 has a high correction capability with respect to data including a random error, which randomly occurs, and a burst error, which occurs consecutively within a certain period. In this case, the random error is corrected in the error correction performed with the PI, and the burst error is corrected with the error correction performed with the PO.

It should be apparent to those skilled in the art that the present invention may be embodied in many other specific forms without departing from the spirit or scope of the invention. Particularly, it should be understood that the present invention may be embodied in the following forms.

The scrambling circuit 26 and the descrambling circuit 21 do not have to be independent circuits. If the scrambled data undergoes scrambling again to obtain non-scrambled data that has not undergone scrambling, the scrambling circuit 26 may also function as the descrambling circuit 21.

The buffering circuit 16 may perform buffering without being synchronized with the synchronization signal detected by the synchronization detection circuit 14.

The circuits 13 to 16, which perform the series of processing from sampling the signal from the DVD to buffering the signal, are incorporated in the code error corrector 10 of the preferred embodiment. However, at least some of these circuits 13 to 16 may be arranged outside the code error corrector 10.

Part of the functions achieved by the hardware of the code error corrector 10 may be achieved through software.

The data subject to processing by the code error corrector 10 is not limited to the data to which an error correction code, which includes the inner parity PI and the outer parity PO, are added. The data subject to processing may be data to which only either PI or PO is added. In this case, the error correction is performed using the single error correction code.

The recording medium is not limited to a DVD. The present invention may be applied to a code error corrector incorporated in a device that reproduces data recorded in a recording medium other than a DVD to which an error correction code is added.

The present examples and embodiment are to be considered as illustrative and not restrictive, and the invention is not to be limited to the details given herein, but may be modified within the scope and equivalence of the appended claims.

What is claimed is:

1. A code error corrector for use with a buffer memory for correcting a code error in input data generated by adding an error detection code to main data, scrambling the main data, and adding an error correction code to the scrambled data and the error detection code, the code error corrector comprising:

a correction circuit for performing error correction on the input data based on the error correction code to generate first data;

a descrambling circuit connected to the correction circuit to descramble the first data and generate second data, wherein the descrambling circuit writes the second data to the buffer memory;

a detection circuit connected to the descrambling circuit to perform error detection on the second data based on the error detection code;

a scrambling circuit for reading the second data from the buffer memory and scrambling the second data to generate third data; and a switching circuit connected between the scrambling circuit and the correction circuit to provide either one of the third data and the input data to the correction circuit, wherein the correction circuit repetitively performs the error correction on the input data, and the detection circuit performs the error detection after each time the error correction circuit performs the error correction, the repeating of the error correction being stopped if the detection circuit does not detect a data error.

2. The code error corrector according to claim 1, wherein the error correction code includes a first error correction code and a second error correction code, the correction circuit performs a first error correction on the input data based on the first error correction code and a second error correction on the data that has undergone the first error correction based on the second error correction code, and the detection circuit performs a first error detection on the data that has undergone the first correction and a second error detection on the data that has undergone the second error correction.

3. The code error corrector according to claim 2, wherein the repeating of the first and second error corrections are stopped when a data error is not detected in at least one of the first and second error detections.

4. The code error corrector according to claim 2, wherein the input data is DVD data, and the first and second error correction codes are respectively an inner parity and
an outer parity that are added as part of the DVD data to the main data.

5. A method for correcting a code error in a data block including scrambled data, an error detection code, a first error correction code, and a second error correction code, the method comprising:

generating first correction data by performing error correction on the data block based on the first error correction code;

generating descrambled data by descrambling the first correction data;

storing the descrambled data;

detecting whether an error is included in the descrambled data;

retrieving the descrambled data;

generating second correction data by performing error correction on the retrieved descrambled data based on the second error correction code;

storing the second correction data;

detecting whether an error is included in the second correction data;

retrieving the second correction data;

generating scrambled data by scrambling the retrieved second correction data;

repeating the above series of steps for a predetermined number of times using the scrambled data in lieu of the data block; and stopping said repeating before reaching the predetermined number of times if an error is not detected in at lease one of said detecting of error in the descrambled data and detecting of error in the second correction data.

6. A code error corrector for correcting a code error in a data block including an error detection code, a first error correction code, a second error correction code, and scrambled data, the code error corrector comprising:

a first correction circuit for performing error correction on the data block based on the first error correction code to generate first correction data;

a descrambling circuit connected to the first correction circuit to descramble the first correction data;

a first error detection circuit for detecting whether an error is included in the descrambled first correction data;

a second correction circuit for performing error correction on the descrambled first correction data based on the second error correction code to generate second correction data;

a second error detection circuit for detecting whether an error is included in the second correction data; and a controller for alternately providing the first correction circuit and the second correction circuit with a signal for activating the respective first correction circuit and second correction circuit when either one of the first and second error detection circuits are continuously operating for detecting a data error and until the first error correction circuit, the second error correction circuit, the first error detection circuit, and the second error detection circuit perform processing for a predetermined number of times.

* * * * *